(12) United States Patent
Sessions et al.

(10) Patent No.: US 12,624,748 B2
(45) Date of Patent: May 12, 2026

(54) EXPANDING FORCE ELECTRIC LINEAR ACTUATOR

(71) Applicant: Liftwave, Inc., Somerville, MA (US)

(72) Inventors: Blake Sessions, Boston, MA (US); Toomas Sepp, Somerville, MA (US)

(73) Assignee: Liftwave, Inc., Somerville, MA (US)

( * ) Notice: Subject to any disclaimer, the term of this patent is extended or adjusted under 35 U.S.C. 154(b) by 45 days.

(21) Appl. No.: 18/907,750

(22) Filed: Oct. 7, 2024

(65) Prior Publication Data

US 2025/0257793 A1 Aug. 14, 2025

Related U.S. Application Data

(63) Continuation of application No. 18/436,624, filed on Feb. 8, 2024, now Pat. No. 12,135,072.

(51) Int. Cl.
| | |
|---|---|
| *F16H 19/06* | (2006.01) |
| *F16H 55/36* | (2006.01) |
| *F16H 63/06* | (2006.01) |

(52) U.S. Cl.
CPC ......... *F16H 19/0628* (2020.05); *F16H 55/36* (2013.01); *F16H 63/062* (2013.01); *F16H 2019/0668* (2013.01)

(58) Field of Classification Search
CPC .... F16H 19/0628; F16H 55/36; F16H 63/062; F16H 2019/0668
See application file for complete search history.

(56) References Cited

U.S. PATENT DOCUMENTS

| | | | |
|---|---|---|---|
| 11,746,860 B2 | 9/2023 | Sessions et al. | |
| 11,835,132 B2 | 12/2023 | Sessions | |
| 2006/0191362 A1 | 8/2006 | Garrec | |
| 2023/0366453 A1* | 11/2023 | Sessions | ............ F16H 19/0628 |

FOREIGN PATENT DOCUMENTS

| | | |
|---|---|---|
| DE | 102005006864 A1 | 8/2006 |
| EP | 3679275 B1 | 11/2022 |

OTHER PUBLICATIONS

International Search Report and Written Opinion in International Appln. No. PCT/US2025/014613, mailed on May 12, 2025, 14 pages.

* cited by examiner

*Primary Examiner* — Terence Boes
(74) *Attorney, Agent, or Firm* — Fish & Richardson P.C.

(57) ABSTRACT

In general, this disclosure involves a pulley system that includes a plurality of fixed sheaves arranged to at least partially encircle an output shaft, a plurality of traveling sheaves coupled to the output shaft. The output shaft can be configured to pass through the fixed sheaves and translate along an axis of travel and the plurality of traveling sheaves can be arranged such that a geometric average of belt tension created by spans of belt between the plurality of traveling sheaves and the plurality of fixed sheaves is approximately coincident with a centerline of the output shaft. The system further includes a belt extending between and around the plurality of fixed sheaves and the plurality of traveling sheaves such that the belt flexes toward a single surface of the belt.

20 Claims, 9 Drawing Sheets

Span 602J

Span 602I

Span 602H

Span 602G

Span 602F

Span 602E

Output Shaft 110

Belt in 506

Shaft Centerline 604

Span 602A

Span 602B

Span 602C

Span 602D

EXPANDING FORCE ELECTRIC LINEAR ACTUATOR

CROSS REFERENCE TO RELATED APPLICATION

This application is a continuation of U.S. patent application Ser. No. 18/436,624, filed Feb. 8, 2024, the contents of which are hereby incorporated by reference in its entirety.

TECHNICAL FIELD

This disclosure generally relates to a pulley system arranged to enable expansion of an electrically driven linear actuator.

BACKGROUND

Modern belts have many desirable characteristics. They can be lightweight, low-maintenance, and have high strength under tension. Many new and old applications of modern belts are currently being adapted.

SUMMARY

In general, the disclosure involves a pulley system and method of use that includes a plurality of fixed sheaves arranged to at least partially encircle an output shaft, a plurality of traveling sheaves coupled to the output shaft. The output shaft can be configured to pass through the fixed sheaves and translate along an axis of travel and the plurality of traveling sheaves can be arranged such that a geometric average of belt tension created by spans of belt between the plurality of traveling sheaves and the plurality of fixed sheaves is approximately coincident with a centerline of the output shaft. The system further includes a belt extending between and around the plurality of fixed sheaves and the plurality of traveling sheaves such that the belt flexes toward a single surface of the belt.

Implementations can optionally include one or more of the following features.

In some instances, the plurality of fixed sheaves includes six sheaves arranged in pairs on three axles that are mounted to a device casing, one pair of sheaves is arranged such that the sheave positioned farther from the output shaft is smaller in diameter than the sheave positioned closer to the output shaft. Two pairs of sheaves are arranged such that the sheaves positioned farther from the output shaft are larger in diameter than the sheaves positioned closer to the output shaft.

In some instances, the plurality of fixed sheaves are retained on the three axles by a set of flanged end caps that are each bolted to the device casing through a center of their respective axle.

In some instances, two additional belt spans each exit the larger sheaves on the two pairs of sheaves arranged such that the larger diameter sheave is positioned farther from the output shaft and are positioned externally to the device casing.

In some instances, the plurality of traveling sheaves includes five sheaves coupled to an end of the output shaft.

In some instances, the belt forms at least ten spans between the plurality of traveling sheaves and the plurality of fixed sheaves.

In some instances the pulley system is at least partially enclosed by the device casing, and the device casing is cylindrical.

This disclosure describes a pulley system that enables extension and contraction of a linear actuator under an expanding force and is configured to fit around the output shaft of that linear actuator. Belt driven systems can have many advantages over other similar systems. For example, a belt driven linear actuator can require less maintenance, be lighter weight, and be capable of more cycles than a similar hydraulic linear actuator. Further the belt driven system, when operated by an electric motor is capable of recouping energy during some movement events (e.g., lowering a load). Many belt drive mechanisms include a capstan, which can receive one or more turns or partial turns of a belt and provide rotational force to draw/take in or pay out the belt. The capstan can be powered by, for example, an electric motor via a set of reduction gears or a hydraulic motor, among other things. The belt can be drawn/taken in or payed out to and from various pulley systems within the linear actuator.

To improve durability and maximum capacity of a belt-driven actuator, the internal pulley system can be designed with certain parameters. In general, belt wear and stress will be a limiting factor, and can be reduced by reducing (e.g., minimizing) the amount of bend the belt is subjected to. At the same time, the overall size and shape of the actuator can be similar to the form factor of conventional actuators such as hydraulic pistons. Therefore, this disclosure describes a pulley system that is capable of handling large loads while maintaining an approximately cylindrical form factor. Bending a belt causes non-uniform internal stresses within the belt that can cause accelerated degradation. Thus, minimizing the amount of bend in the belt increases maximum load capacity and service life. To minimize the amount of bend, the device can include relatively large sheaves, and can include only bends in a single direction, that is, avoiding "back bending" or contra-flexion of the belt. The disclosed pulley configuration is designed to allow for large sheaves contained within a relatively small cross-section and does not contra-flex the belt.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

To describe technical solutions in the implementations of the present specification or in the existing technology more clearly, the following briefly describes the accompanying drawings needed for describing the implementations or the existing technology. The accompanying drawings in the following descriptions merely show some implementations of the present specification, and a person of ordinary skill in the art can still derive other drawings from these accompanying drawings without creative efforts.

Like reference numbers and designations in the various drawings indicate like elements.

DETAILED DESCRIPTION

This disclosure describes a pulley system which can be used to enable contraction and extension of a belt-driven linear actuator under compression loading.

Figure 1:
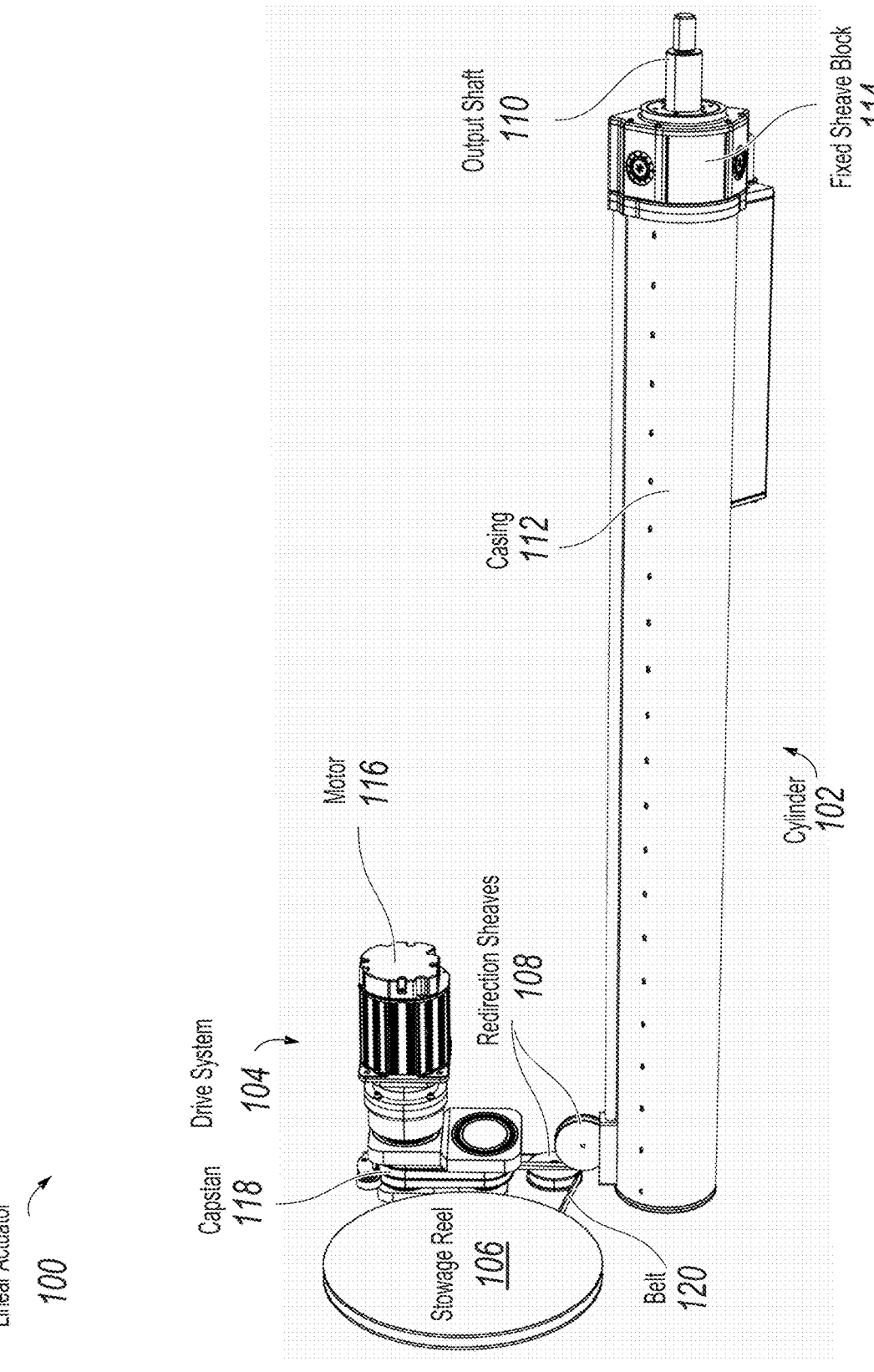
FIG. 1 depicts an example single action, belt-driven, expanding force linear actuator.

FIG. 1 depicts an example single action, belt-driven, expanding force linear actuator 100. The linear actuator 100 includes a cylinder 102, and a drive system 104 that operates the cylinder 102. The cylinder 102 includes a casing 112, an output shaft 110, a fixed sheave block 114 and other components which house and make up an internal pulley system that operate to extend the output shaft 110 to the right in the illustrated figure. As shown, the cylinder 102 is in a contracted state. When the drive system 102 removes belt from the cylinder 102, the output shaft 110 will protrude, translating right (as illustrated) and expanding the linear actuator 100. When the drive system 102 pays out belt to the cylinder 102, the output shaft 110 will translate to the left (as illustrated), contracting the linear actuator 100. The drive system 104 includes a motor 116, a capstan 118, a stowage reel 106, and redirection sheaves 108.

The drive system 104 works to withdraw the belt 110 from the cylinder 102 by using the motor 116 to rotate the capstan 118. The motor 116 can be an electric motor, such as a brushless DC motor (e.g., Teknic Hudson or Parker GVM), a stepper motor, an AC motor, or another type of electric motor. Because the pulley system within the cylinder 102 includes a high reduction (e.g., 5:1 or 10:1), a relatively small motor can generate a large amount of force at the output shaft 110. The motor 116 rotates the capstan 118, which is frictionally engaged with the belt 120, as the belt 120 is wrapped around the capstan 118 by one or more turns. A stowage reel 106 or spool is provided to take in excess belt 120 as it is removed from the cylinder 102 and maintain tension as belt 120 is payed out into the cylinder 102. The drive system 104 can be similar to the drive system disclosed in U.S. Pat. No. 11,746,860 the contents of which are hereby incorporated herein in their entirety.

While the linear actuator 100 has been illustrated as including the stowage reel 106, in some implementations, the system includes no stowage reel. In such cases, for example, a set of opposed block and tackle pulley systems within cylinder 102 can exchange belt between them so the total length of belt within the cylinder 102 does not substantially change as the actuator translates.

The cylinder 102 houses the pulley system of the linear actuator 100. It includes the casing 112, which can provide structural support as well as sealing and foreign body protection for the internals. A fixed sheave block 114 can be mounted at one end of the casing 112, which contains bearings and axles for a number of fixed sheaves, which are discussed in more detail below with respect to FIGS. 2-9. While called a "cylinder" and generally cylindrical in shape, it should be noted that the cylinder 102 need not be cylindrical. In some implementations the cylinder 102 is a rectangular shape, or triangular, or any suitable shape for housing the internal components for the linear actuator 100. Casing 112 can be made of steel, aluminum, composite materials, polyurethane, or other suitable structural material.

In some implementations, the cylinder 102 is hermetically sealed, providing a closed interior volume, and protecting the internals from particulate or gaseous contamination. In some implementations, the internal volume of the cylinder 102 can be pressurized, or at a vacuum relative to ambient pressure. In some implementations, the cylinder 102 includes an emergency pressurization system, which can provide static hold capability or energy absorption in the event of a belt failure. For example, if the device is carrying a load, and the belt fails, the cylinder 102 can be rapidly pressurized to operate, at least temporarily, as a pneumatic cylinder, in order to prevent or stop inadvertent movement of the linear actuator 100 due to the load.

The output shaft 110 can be a solid shaft that extends through one end of the fixed sheave block 114. Solid shafts can be advantageous in that they are stronger than a hollow shaft for a given weight or diameter. In some implementations, the output shaft 110 is hollow, which allows for reduced weight or increased stiffness at a given weight of the output shaft 110.

It should be noted that the drive system 104 is illustrated throughout this disclosure as mounted directly adjacent to, and oriented in parallel, with the cylinder 102. However, the drive system 104 can be remote from the cylinder and mounted at various orientations or distances depending on the particular application for the linear actuator 100. Similarly, while stowage reel 106 is shown adjacent to the drive system 104 and the cylinder 102, it can be remote, or separate from both as well.

Figure 2:
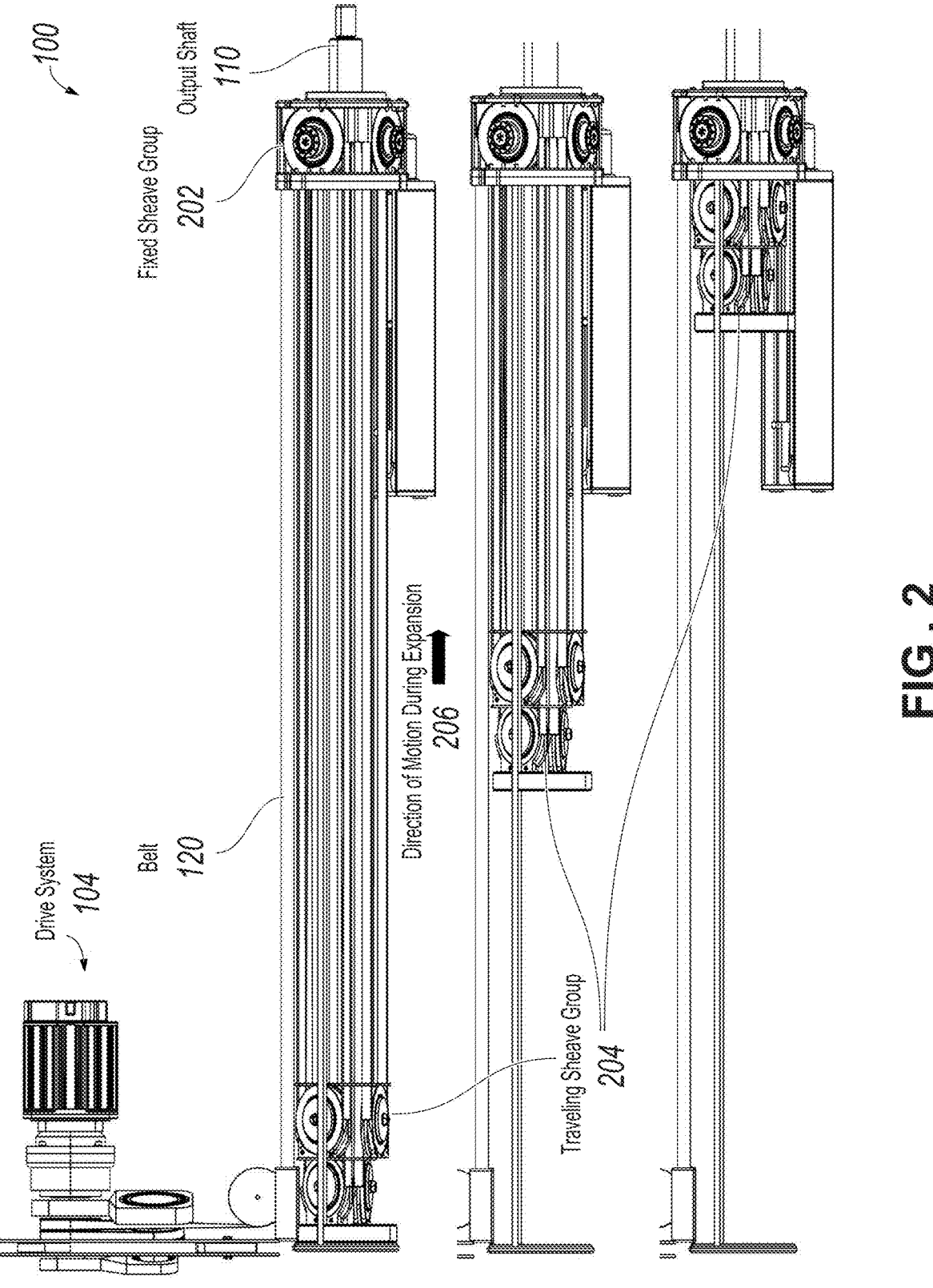
FIG. 2 illustrates motion of traveling sheaves in the expanding force linear actuator of FIG. 1.

FIG. 2 illustrates motion of traveling components in the expanding force linear actuator 100. The casing 112 has been removed giving a view of internal components of the cylinder 102, including certain spans of the belt 120 and the traveling sheave group 204. Further, the cylinder 102 has been reproduced with the linear actuator 100 in three different positions of travel: contracted, middle, and extended. Finally, the fixed sheave block 114 has been removed, revealing the fixed sheave group 202.

As the drive system 104 draws belt 120 from the cylinder 102, the spans between the fixed sheave group 202 and the traveling sheave group 204 become shorter. The traveling sheave group 204, which are affixed to an end of the output shaft 110, are pulled toward the fixed sheave group 202, and the output shaft 110 translates in the direction of motion 206, extending (or expanding) the linear actuator 100.

The belt 120 can be a flat belt that is formed by encasing two or more wire ropes in a jacket. For example, ten multi-strand wire ropes can be aligned in a parallel manner and then enclosed in a polyurethane jacket. The wire ropes can be enclosed by over molding using injection molding, or the jacket material can be extruded over the wire ropes. In general, the belt 120 is a flexible belt capable of withstanding large tensile loads. This can enable a high strength and high durability belt that can withstand sufficient bend stresses to allow for the use of relatively small diameter sheaves. In some implementations, the wire ropes within the belt 120 can be pre-tensioned in a non-uniform manner to increase the twist and fleet angle tolerance of the belt 120.

While illustrated throughout this disclosure as having a rectangular cross section, the belt 120 can have a square, trapezoidal, or triangular cross section. In some implementations, the cross section of the belt changes. For example, a rectangular belt can be used in the drive system, but a trapezoidal belt can be used in portions of the cylinder section.

Figure 3:
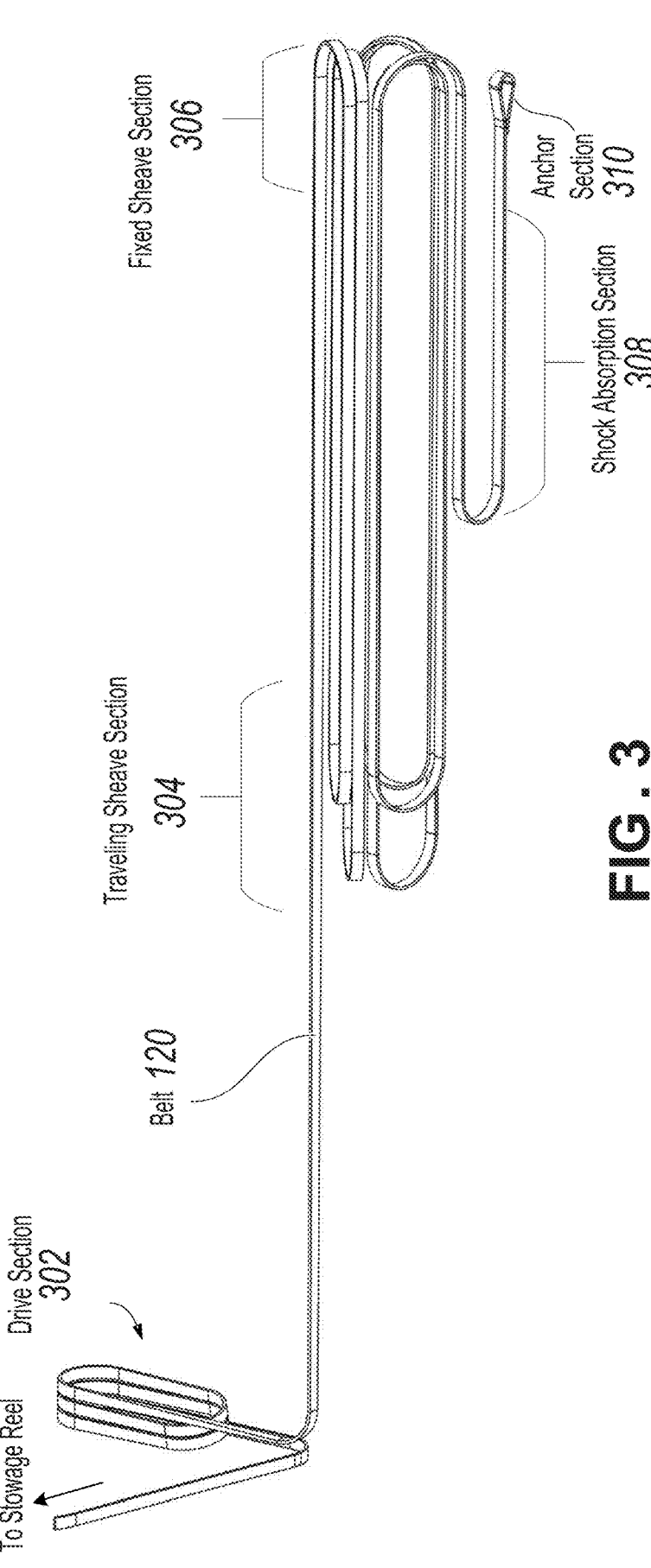
FIG. 3 depicts an example belt topography for the belt driven, expanding force linear actuator of FIG. 1.

FIG. 3 depicts an example belt topology 300 for the belt driven, expanding force linear actuator 100 of FIG. 1. The belt 120 can be viewed in sections: a drive section 302, a traveling sheave section 304, a fixed sheave section 306, and a shock absorption section 308, and an anchor section 310

The drive section 302 of the belt 120 includes a number of turns around the capstan 118 (shown in FIG. 1), and in some implementations, an idler shaft, before the belt passes into the cylinder 102. Additionally, a pair of bends are caused by the redirection sheaves 108 (shown in FIG. 1), which can be used to position the drive system 104 and stowage reel 106 at the desired location relative to the cylinder 102. While three turns around the capstan 118 are illustrated, fewer or greater turns can be used in the drive section 302.

The traveling sheave section 304 is the portion of the belt 120 that passes over the traveling sheave group 204, forming multiple spans between the traveling sheave group 204 and the fixed sheave group 202 that result in a reduction. The illustrated belt topology 300 includes ten spans between the fixed sheaves and the traveling sheaves and will result in a 10:1 reduction ratio between the drive section 302 and movement of the traveling sheave section 304. That is, for every ten inches of belt drawn from the cylinder 102, the traveling sheave section 304 and output shaft 110 will translate one inch, neglecting second order effects such as material elasticity and manufactured component tolerance.

The fixed sheave section 306 is the portion of the belt 120 routed over the fixed sheave group 202 which is rigidly mounted to the fixed sheave mounting block 114. Together, these components provide the reaction force to "pull" the traveling sheave group 204 and output shaft 110 during an expansion movement.

As the belt 120 exits the final fixed sheave 202, it passes into a shock absorption section 308. In the shock absorption section 308 the belt passes over a shock absorber 402 (described below with reference to FIG. 4) and terminates at an anchor 410. The anchor 410 is a wedge mechanism that affixes the belt 120 to the structure of the device, providing a fixed reference for the remainder of the belt 120. In some implementations, an additional anchor is provided within the stowage reel 106.

It should be noted that throughout the traveling sheave section 304, the fixed sheave section 306, and the shock absorption section 308, the belt is bent in a single direction, or towards a single side. There is no back bending or contra-flexion in the belt with this belt topology, which enables an increased working load. This is because the wire ropes within the belt experience less cyclic bending stress, and thus can withstand higher tensile loads while controlling for fatigue life.

Figure 4:
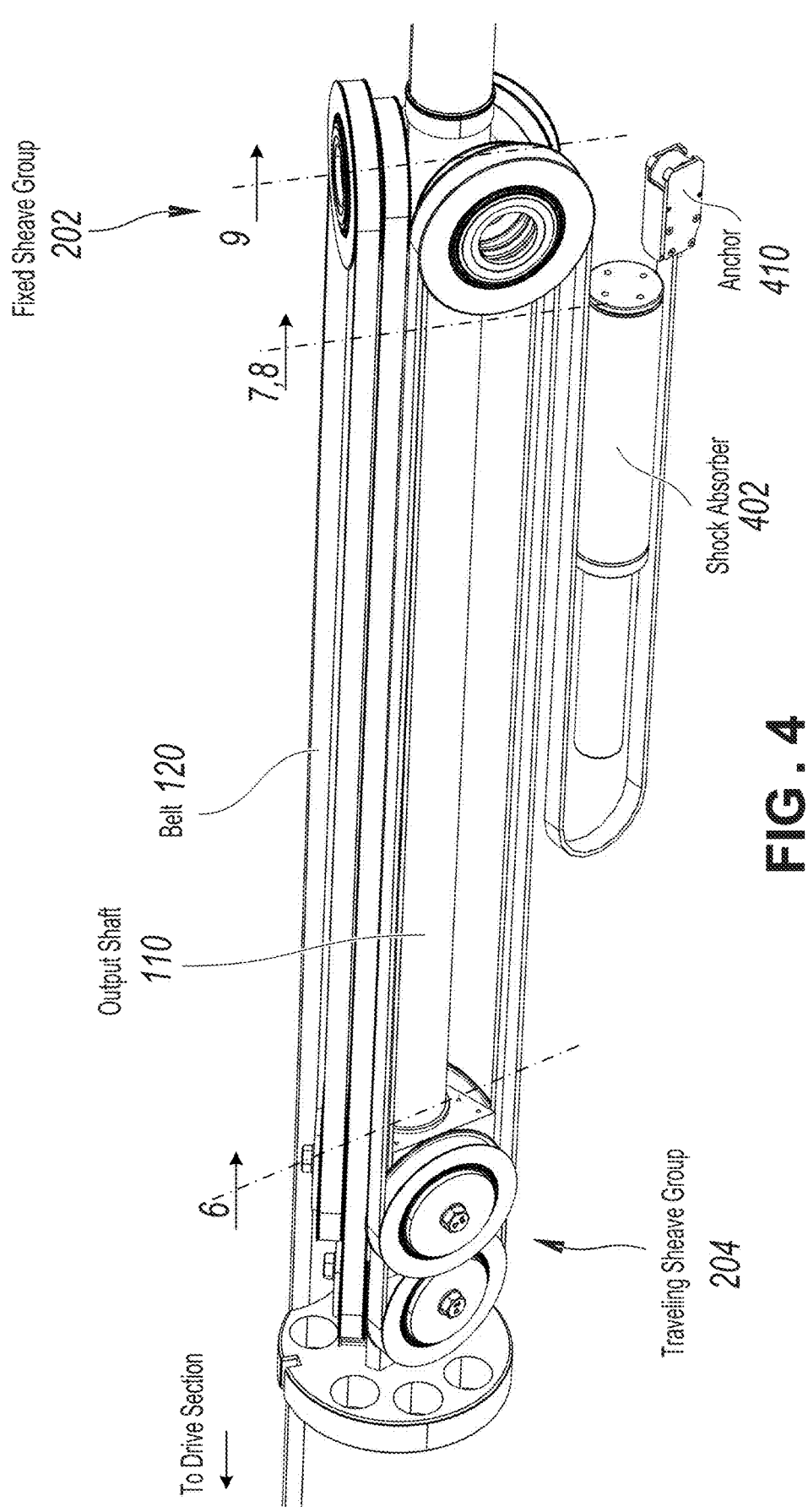
FIG. 4 depicts a perspective view of some internal components of the expanding force linear actuator of FIG. 1.

FIG. 4 depicts a perspective view of some internal components of the expanding linear actuator 100. The traveling sheave group 204 is mounted to the end of the output shaft 110. The fixed sheave group 202 is mounted to the fixed sheave block 114 (shown in FIG. 1) and the belt 120 is reeved around the fixed sheave group 202 and traveling sheave group 204 to form a number of spans, before passing over the shock absorber 402 and terminating at the anchor 410.

The shock absorber 402 can be a gas or hydraulic spring/damper system that provides the linear actuator with some measure of compliance for the purpose of shock tolerance. For example, rapid increases in loading on the linear actuator 100 can result in large tension impulses in the belt. The shock absorber 402 can compress, relieving that tension and damping the energy from the impulse. In some implementations, the shock absorber 402 is a nitrogen charged gas spring, such as a Tevema H4200 series.

Several cutaway marks are indicated in FIG. 4, which show where the view for FIGS. 6, 7, 8, and 9 are illustrated.

Figure 5:
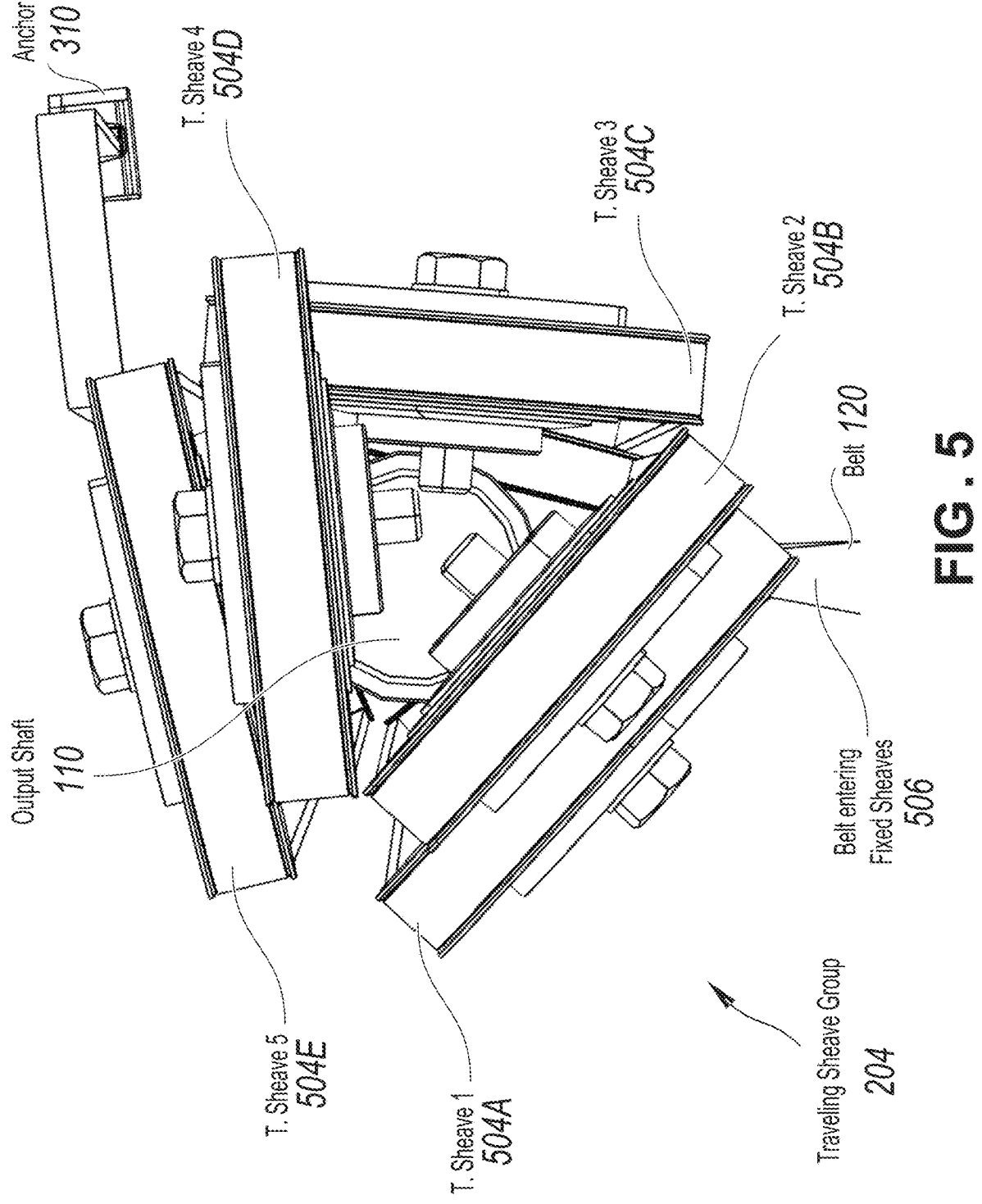
FIG. 5 depicts an end view of traveling sheaves for the belt-driven linear actuator of FIG. 1.

FIG. 5 depicts an end view of the traveling sheave group 204 for the belt-driven linear actuator 100. Certain structural components have been removed for clarity, and the formation of the traveling sheave group 204 is shown.

The traveling sheave group 204 generally include two pairs of two sheaves, with an intermediate sheave providing a transition between them. Specifically, traveling sheave 1 504A and traveling sheave 2 504B form a first pair. The belt 120 passes over one of the fixed sheave group 202, then around traveling sheave 1 504A, back to the fixed sheave group 202, then around traveling sheave 2 504B, then follows a twisted span back to the fixed sheave group 202. The belt 120 returns to traveling sheave 3 504C, passes over it and then back to the fixed sheave group 202. Another twisted span feeds from the fixed sheave group 202 over traveling sheave 4 504D, then back to the fixed sheave group 202 before passing around traveling sheave 504E, around the final fixed sheave, through the shock absorber section 308, and to anchor 410.

It should be noted that the twisted spans will have dynamic twist ratios, with their twist ratio increasing as the traveling sheave group 204 translate toward the fixed sheave group 202. Twist ratio for a span of belt can be defined as the length of a free span divided by the belt width for a 90-degree twist. For example, a belt with a 10 mm width and a 300 mm free span that is twisted at 45 degrees would have a twist ratio of 60:1. The twist ratio can be given by the equation $$T.R. = \frac{L_{Span}}{W_{belt}} \times \frac{90}{\text{Twist}},$$

where $L_{span}$ is the length of the free span, $W_{belt}$ is the width of the belt, and Twist is the amount of twist in the span in degrees. In some implementations, twist ratios of 20:1 or less result in a reduction in service life of the belt. In some implementations, higher twist ratios (e.g., 12:1, or 15:1, etc.) can be permissible if a compensating fleet angle is introduced. This is further described in U.S. Pat. No. 11,835,132 the contents of which are incorporated herein by reference.

In the illustrated implementation, where the sheaves form an approximately triangular shape, the twisted spans in the linear actuator 100 have twists of approximately 60-75 degrees each, including the belt in span 506 that connects the fixed sheaves 202 to the drive system 104, the span entering traveling sheave 2 504B, and the span entering traveling sheave 3 504C. The configuration of traveling sheaves illustrated in FIG. 5 represents a tradeoff between maximizing sheave size, and thus load bearing capability of the belt, and number of sheaves, and thus reduction ratio. Including more sheaves to increase the reduction ratio requires smaller sheaves to fit within the same footprint, and therefore would decrease the load capacity of the belt bending around each sheave. Further, to prevent contra-flexion within the belt, more twisted spans with larger twists (a greater twist ratio) would be required.

Figure 6:
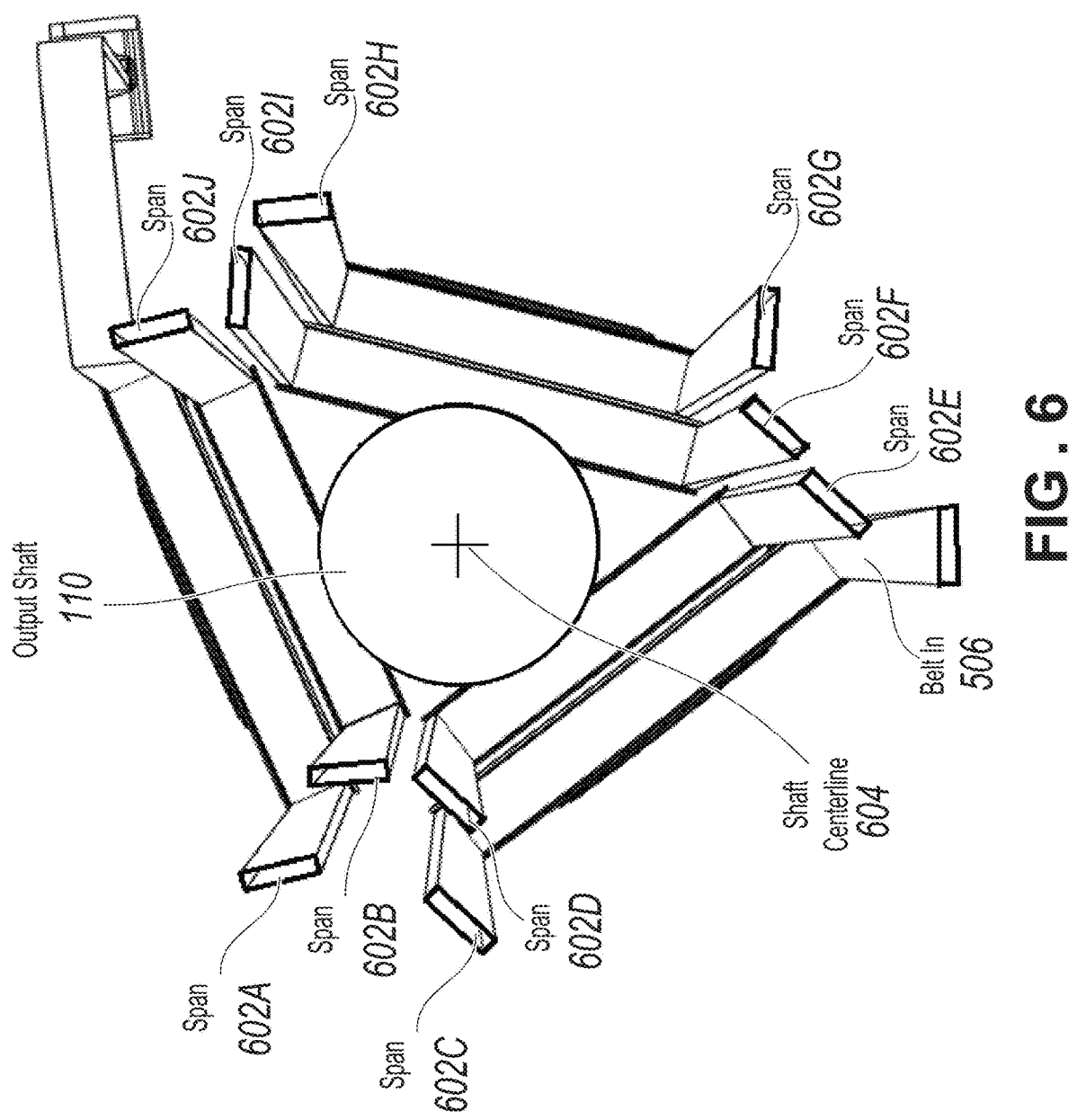
FIG. 6 is a partial cut-away diagram illustrating span geometry within the belt-driven linear actuator of FIG. 1.

FIG. 6 is a partial cut-away diagram illustrating span geometry within the belt-driven linear actuator 100. Spans 602A-J act in tension to pull the traveling sheave group 204 toward the fixed sheave group 202 during an expansion movement and thereby translate the output shaft 110 along its centerline 604.

One feature of the illustrated configuration is that the center of action, or the geometric average of all the tensile forces applied to the group of traveling sheaves is nearly coincident with the shaft centerline 604. This geometry is advantageous in that the net force applied to the output shaft 110 is nearly entirely in the direction of travel, thus reducing (e.g., minimizing) undesirable moments and additional friction due to off-axis forces. In some implementations, the center of action is less than 2 mm for a cylinder 102 with a 305 mm inner diameter. In some implementations, this is considered approximately coincident with the shaft centerline 604. Approximately coincident in this context can be defined to be a geometric center of loading action by the belt system that deviates from the output shaft centerline 604 by less than 10 percent of the overall cylinder 102 diameter.

Figure 7:
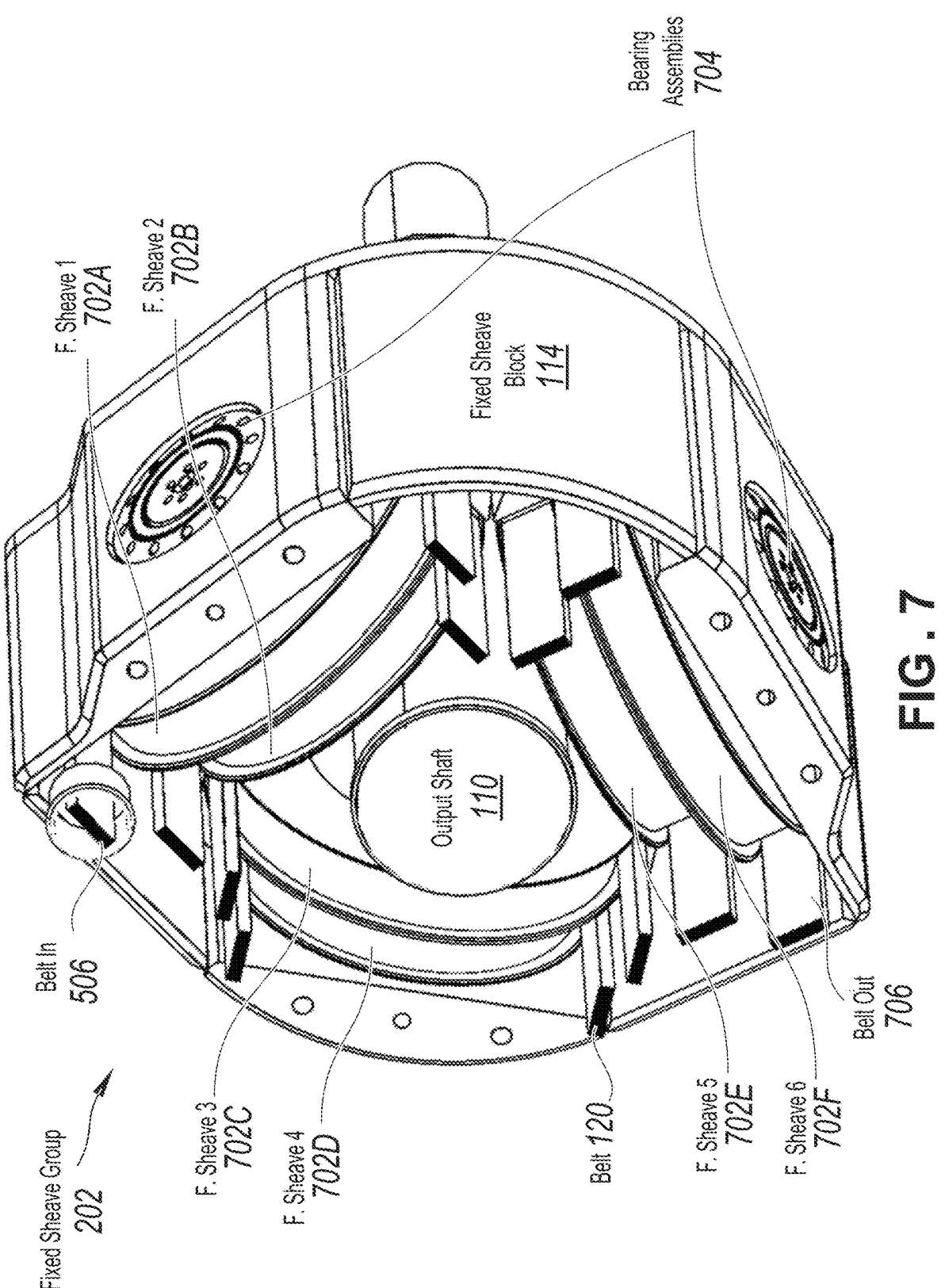
FIG. 7 illustrates a partial cut-away diagram illustrating fixed sheaves within the belt-driven linear actuator of FIG. 1.

FIG. 7 illustrates a partial cut-away diagram illustrating the fixed sheave group 202 within the belt-driven linear actuator 100. The belt 120 enters the fixed sheave group 202 from the drive system 104 via the belt in span 506, and passes around fixed sheave 1 702A, before traveling to the traveling sheave group 204, then returning to pass around fixed sheave 2 702B. The belt 120 passes from fixed sheave 2 702B to the traveling sheave group 204 and returns to fixed sheave 3 702C. This continues as the belt passes between the traveling sheaves and fixed sheaves 4, 5, and 6 702D-F, before passing down the belt out span 706 to the anchor section 310. The fixed sheave group 202 is mounted to the fixed sheave block 114 by three bearing assemblies 704. Each bearing assembly 704 supports two fixed sheaves and enables each fixed sheave to rotate independently. The bearing assemblies 704 are arranged approximately 120 degrees apart around the output shaft 110 and the fixed sheave group 202 forms a set of two triangles to maximize their size within the given space. Additionally, fixed sheave 1 702A and fixed sheave 6 702F are larger than their paired inner fixed sheaves 702B, 702E, respectively. This permits the belt in span 506 and belt out span 706 to travel externally to the main cylindrical volume formed by the casing 112, while fixed sheave 4 702D has a smaller diameter than fixed sheave 3 702C. This configuration maximizes sheave size within the footprint of the cylinder, while enabling alignment of spans to the traveling sheave group 204 with minimal fleet angles and twist.

The fixed sheave group 202 generally forms a ring or annulus (in this case triangular arrangement) around the output shaft 110. In order to maximize the use of the space, the sheaves are positioned as close to the output shaft 110 as possible without contacting the output shaft. In some implementations, there is less than 1 mm of space between the inner fixed sheave and the output shaft.

Figure 8:
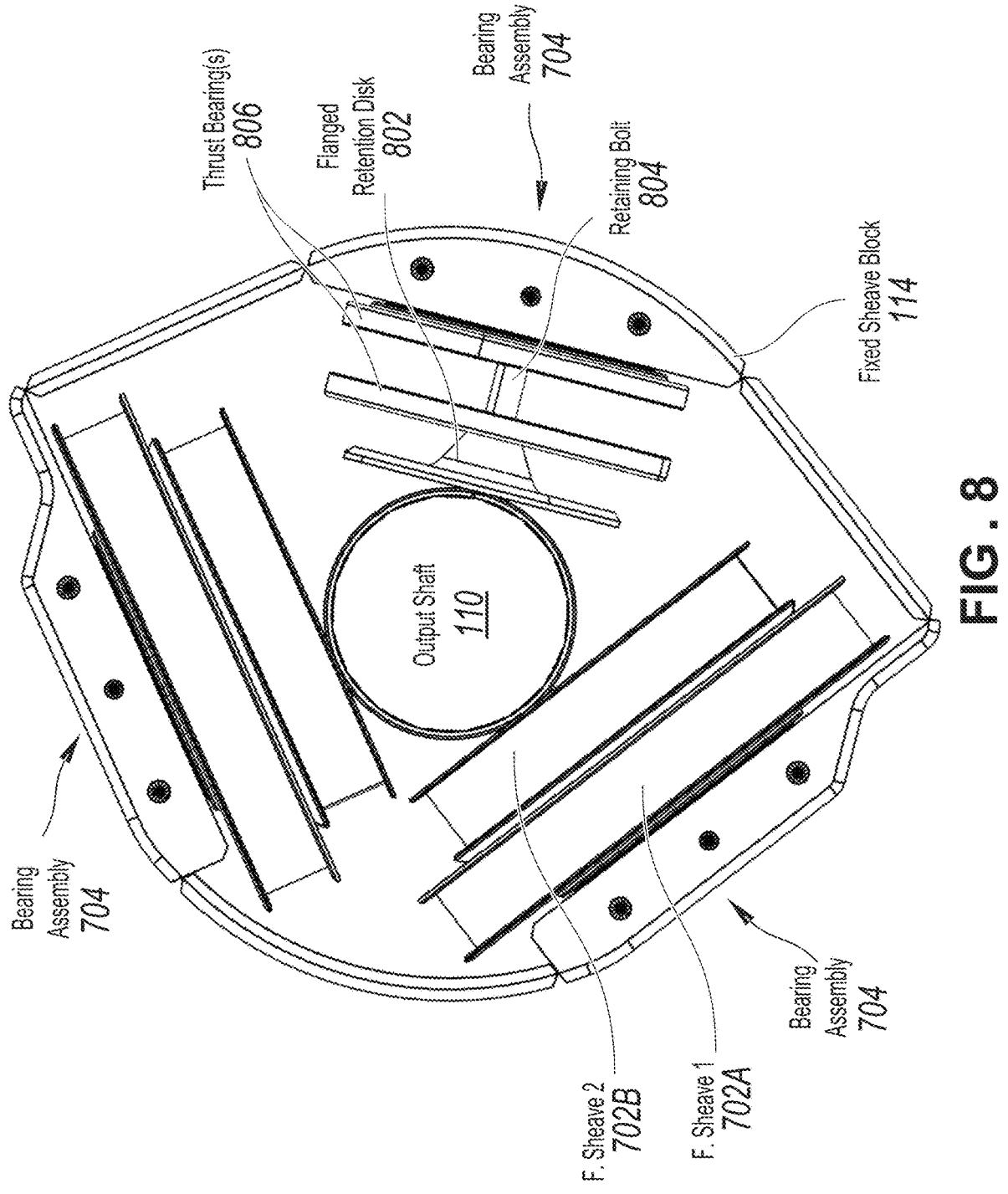
FIG. 8 illustrates a partial cut-away diagram illustrating fixed sheaves of the linear actuator of FIG. 1 with some sheaves removed to show bearing structure.

FIG. 8 illustrates a partial cut-away diagram illustrating fixed sheaves with some sheaves removed to show bearing structure. The bearing assemblies 704 retain the sheaves on their respective axles using a flanged retention disk 802 and a retaining bolt 804 that passes through the center of the axle (shown below with respect to FIG. 9). Thrust bearings 806 are provided between the outer sheaves and the fixed sheave block 114, as well as between individual sheaves. The flanged retention disk 802 compresses the sheave stack as retaining bolt 804 is threaded into a retaining cap (shown below in FIG. 9) on the fixed sheave block 114. The flanged retention disk 802 can sit within a recess in the inner flange, and thus the assembly does not protrude inward past the inner edge of the flange.

Figure 9:
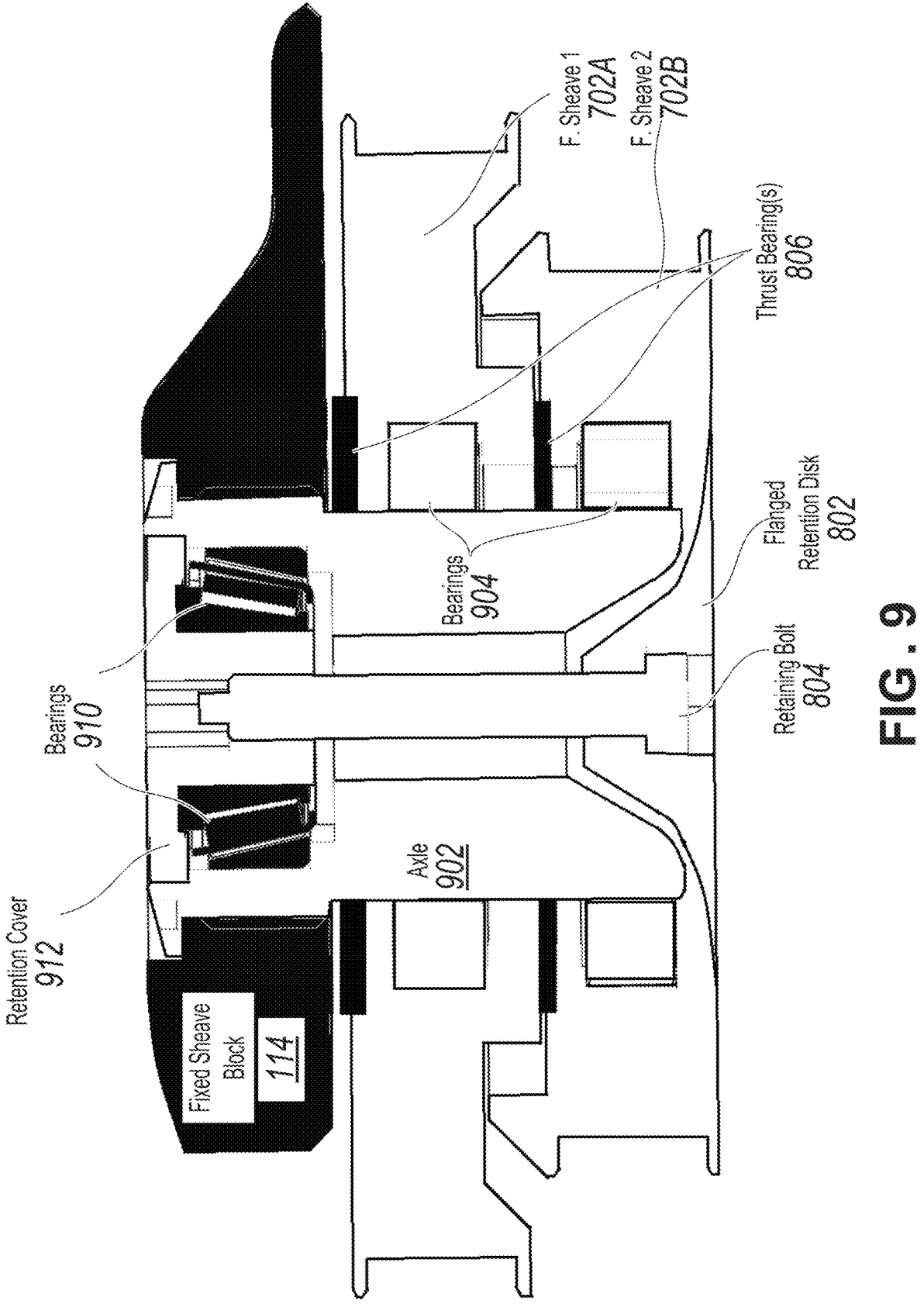
FIG. 9 illustrates a partial cut-away diagram showing a set of fixed sheaves on a shared axle of the linear actuator of FIG. 1.

FIG. 9 illustrates a partial cut-away diagram showing a set of fixed sheaves on a shared axle. The axle 902 can be rigidly affixed to the fixed sheave block 114. Sheaves (e.g., fixed sheaves 1 and 2, 702A-B) can be fitted around the axle 902 and rotate on bearings 904 independently of the axle 902. The flanged retention disk 802, retaining bolt 804 and retention cover 912 can work to axially compress the sheaves and bearings onto the fixed sheave block 114. Thrust bearings 806 provided between sheaves reduce friction and enable independent rotation. An additional bearing 910 is provided to support retention cover 912 and allow it to rotate independently of the axle 902. In the illustrated example, the inner sheave (fixed sheave 2 702B), flanged retention disk 802, retaining bolt 804, and retention cover 912 will rotate as a single unit. The axle 902 remains fixed, and fixed sheave 1 702A will rotate independently from the other components. The other fixed sheave groups with their respective bearing assemblies 704 can contain identical bearing components and utilize the same methods of assembly and component loading and function.

To help a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on one or more implementations of the present specification without creative efforts shall fall within the protection scope of the implementations of the present specification.

The foregoing description is provided in the context of one or more particular implementations. Various modifications, alterations, and permutations of the disclosed implementations can be made without departing from scope of the disclosure. Thus, the present disclosure is not intended to be limited only to the described or illustrated implementations, but is to be accorded the widest scope consistent with the principles and features disclosed herein.

The invention claimed is:

1. A pulley system comprising:
   a plurality of fixed sheaves arranged to at least partially encircle an output shaft;
   a plurality of traveling sheaves coupled to the output shaft, the output shaft configured to pass through the fixed sheaves and translate along an axis of travel, wherein the plurality of traveling sheaves are arranged such that a geometric average of belt tension created by spans of belt between the plurality of traveling sheaves and the plurality of fixed sheaves is located within the output shaft; and
   a belt extending between and around the plurality of fixed sheaves and the plurality of traveling sheaves.

2. The system of claim 1, wherein the plurality of fixed sheaves comprises six sheaves arranged in pairs on three axles that are mounted to a device casing, wherein one pair of sheaves is arranged such that the sheave positioned farther from the output shaft is smaller in diameter than the sheave positioned closer to the output shaft, and wherein two pairs of sheaves are arranged such that the sheaves positioned farther from the output shaft are larger in diameter than the sheaves positioned closer to the output shaft.

3. The system of claim 2, wherein the plurality of fixed sheaves are retained on the three axles by a set of flanged end caps that are each bolted to the device casing through a center of their respective axle.

4. The system of claim 2, wherein two belt spans each exiting the larger of the sheaves on the two pairs of sheaves arranged such that the larger diameter sheave positioned farther from the output shaft are positioned externally to a casing that encompasses belt spans between the fixed sheaves and the traveling sheaves.

5. The system of claim 1, wherein the plurality of traveling sheaves comprises five sheaves coupled to an end of the output shaft.

6. The system of claim 1, wherein the belt forms at least ten spans between the plurality of traveling sheaves and the plurality of fixed sheaves.

7. The system of claim 1, wherein the device casing at least partially encloses the pulley system, and wherein a device casing is cylindrical.

8. A belt driven linear actuator comprising:
   a support structure;
   an output shaft;
   a pulley system comprising:
      a plurality of fixed sheaves arranged to at least partially encircle the output shaft;
      a plurality of traveling sheaves coupled to the output shaft, the output shaft configured to pass through fixed sheaves and translate along an axis of travel, wherein the plurality of traveling sheaves are arranged such that a geometric average of belt tension created by spans of belt between the plurality of traveling sheaves and the plurality of fixed sheaves is located within the output shaft; and
      a belt extending between and around the plurality of fixed sheaves; and
   a belt drive mechanism configured to withdraw belt from the pulley system and pay out belt to the pulley system.

9. The actuator of claim 8, wherein the plurality of fixed sheaves comprises six sheaves arranged in pairs on three axles, and wherein the three axles are mounted to the support structure, wherein one pair of sheaves is arranged such that the sheave positioned farther from the output shaft is smaller in diameter than the sheave positioned closer to the output shaft, and wherein two pairs of sheaves are arranged such that the sheaves positioned farther from the output shaft are larger in diameter than the sheaves positioned closer to the output shaft.

10. The actuator of claim 9, wherein the plurality of fixed sheaves are retained on the three axles by a set of flanged end caps that are each bolted to the support structure through a center of their respective axle.

11. The actuator of claim 9, wherein the belt drive mechanism comprises an electric motor and a capstan.

12. The actuator of claim 8, wherein the plurality of traveling sheaves comprises five sheaves coupled to an end of the output shaft.

13. The actuator of claim 8, wherein the belt forms at least ten spans between the plurality of traveling sheaves and the plurality of fixed sheaves.

14. The actuator of claim 8, wherein the pulley system is at least partially enclosed by a cylindrical casing.

15. A method of operating a linear actuator, the method comprising:
   removing a portion of belt from a pulley system using a belt drive mechanism, wherein the pulley system comprises:
      a plurality of fixed sheaves arranged in to at least partially encircle an output shaft;
      a plurality of traveling sheaves coupled to an output shaft, the output shaft configured to pass through the fixed sheaves and translate along an axis of travel, wherein the plurality of traveling sheaves are arranged such that a geometric average of belt tension created by spans of belt between the plurality of traveling sheaves and the plurality of fixed sheaves is located within the output shaft; and
      the belt extending between and around the plurality of fixed sheaves and the plurality of traveling sheaves.

16. The method of claim 15, wherein removing the portion of the belt from the pulley system causes the plurality of traveling sheaves and the output shaft to translate along the axis of travel in an expanding direction.

17. The method of claim 15, comprising:
   paying out a portion of the belt to the pulley system to enable the output shaft to translate along the axis of travel in a contracting direction.

18. The method of claim 15, wherein the plurality of traveling sheaves comprises five sheaves coupled to an end of the output shaft.

19. The method of claim 15, wherein the belt drive mechanism comprises a capstan, and wherein the belt extends from a first anchor point, through the pulley system, about the capstan, and to a stowage reel.

20. The method of claim 19, wherein the capstan is operated by an electric motor.

\* \* \* \* \*